United States Patent [19]
Sasho et al.

[11] Patent Number: 5,103,348
[45] Date of Patent: Apr. 7, 1992

[54] APPARATUS FOR CONTROLLING A TAPE SPEED

[75] Inventors: Hidehiko Sasho; Ichiro Ninomiya; Sojiro Kizu; Masafumi Matsui, all of Kanagawa, Japan

[73] Assignee: Sony Corporation, Tokyo, Japan

[21] Appl. No.: 360,447

[22] Filed: Jun. 2, 1989

[30] Foreign Application Priority Data

Jun. 9, 1988 [JP] Japan ................................ 63-142360

[51] Int. Cl.[5] .............................................. H02P 1/22
[52] U.S. Cl. .................. 360/14.1; 360/73.08; 358/311
[58] Field of Search ............. 360/14.1, 14.2, 14.3, 360/13, 73.04, 73.08; 358/311, 312, 314, 321

[56] References Cited
U.S. PATENT DOCUMENTS 4,507,592 3/1985 Anderson .................... 360/73.04

FOREIGN PATENT DOCUMENTS 60-202590 of 1985 Japan .

Primary Examiner—Roy N. Envall, Jr.
Assistant Examiner—Hung T. Dang
Attorney, Agent, or Firm—Lewis H. Eslinger; Jay H. Maioli

[57] ABSTRACT

An editing apparatus controls a plurality of video tape recorders so that a slow motion picture, a quick motion picture or a combination of the slow motion picture and the quick motion picture reproduced by the video tape recorder can be edited on a video tape. The editing apparatus includes an input keyboard to input data of a desired tape speed at first and second tape positions, a calculating circuit for calculating a tape speed at any position between said first and second positions on the basis of the input data, and a control circuit for controlling a tape speed of said video tape recorders in response to an output signal of said calculating circuit.

11 Claims, 5 Drawing Sheets

APPARATUS FOR CONTROLLING A TAPE SPEED

BACKGROUND OF THE INVENTION

1. Field of the Invention

The present invention relates generally to an apparatus for controlling a tape speed and, more particularly, is directed to an editing apparatus capable of controlling a plurality of video tape recorders in a so-called dynamic motion control system so that a slow motion picture, a quick motion picture or a combination of the slow motion picture and the quick motion picture reproduced by the video tape recorder can be edited on a video tape.

2. Description of the Prior Art

With the spread of video tape recorders and video disk apparatus, a demand for software such as a more sophisticated video tape has been increased. To meet the above-mentioned demand, an editing apparatus is proposed to edit (cut, wipe and dissolve) a desired event by using a plurality of video tape recorders so that the video tape is edited. An official gazette of Japanese laid-open patent application No. 60-202590 discloses this kind of editing apparatus which combines not only desired events but also a slow motion picture and a quick motion picture by a so-called dynamic motion control (DMC) system such as causing a tape of a recording video tape recorder and/or player to run at a running speed different from the normal running speed.

Various dynamic motion control systems are known. According to one of the known systems, a plurality of events are designated within one edition unit and a desired tape running speed can be chosen at each event. In this prior-art system, the recording video tape recorder is operated at a normal tape running speed and commands are supplied to the reproducing video tape recorder (hereinafter, referred to as a player for simplicity) so that the running speed becomes equal to running speeds $S_0$, $S_1$, $S_2$ and $S_3$ provided as parameters of a tape driven by the player designated at times $T_0$, $T_1$, $T_2$ and $T_3$, provided as parameters, within one edition unit (from edit-in point $T_0$ to edit-out point $T_N$) as, for example, shown in FIG. 1. The running speed S of the tape driven by the player is, as a result, varied substantially stepwise except transition times $\Delta T_1$, $\Delta T_2$ and $\Delta T_3$ of the player. Hence, this prior-art system is called "a control system based on [step mode]".

In the prior-art editing apparatus for carrying out the control based on the step mode, it is frequently observed that the motion speed of the edited picture suddenly changes at a certain time, thereby causing the viewer to feel confused. In order to remove the above-mentioned defects, one proposal is made, in which the running speed of the tape drive by the player is varied little by little by increasing the number of events within the edition unit interval. When the number of events is increased, a large number of a pair of parameters {time $T_i$ and running speed $S_i$ of tape to be reproduced where i=0, 1, 2, ...} have to be designated, which method is very complicated in practice.

Further, there exists an editing apparatus of a type which can successively vary a running speed of a tape driven by a player in an analog fashion by its manual dial. This type of editing apparatus cannot reproduce the state that the tape running speed was varied. The problem is then presented that the effect achieved by the change of the tape running speed in some edited video program cannot be effectively utilized to edit other video programs.

OBJECTS AND SUMMARY OF THE INVENTION

Accordingly, it is an object of the present invention to provide an improved editing apparatus which can obviate the defects encountered with the prior art.

More specifically, it is an object of the present invention to provide an editing apparatus which can edit a reproduced picture whose motion speed is varied in a complex fashion or a reproduced picture whose motion speed is smoothly varied by defining a small number of parameters.

According to an aspect of the present invention, there is provided an editing apparatus for editing a video signal by recording the same reproduced from a record medium driven by a reproducing apparatus on a record medium driven by a recording apparatus, comprising:

(a) input means for inputting each data of desired first and second running speeds of said record medium at first and second times, respectively;

(b) means for calculating a running speed of said record medium at a desired time between said first and second times on the basis of said first and second running speeds; and (c) means for generating a running speed of said record medium on the basis of a running speed calculated by said calculating means.

According to other aspect of the present invention, there is provided an editing apparatus for editing a video signal by recording the same reproduced from a record medium driven by a reproducing apparatus on a record medium driven by a recording apparatus, comprising:

(a) input means for inputting each data of desired first and second running speeds of said record medium driven by said reproducing and/or recording apparatus at first and second physical positions of said record medium, respectively;

(b) means connected to said input means for generating data of running speed of said record medium at a desired position between said first and second physical positions by calculating data corresponding to said first and second running speeds of said record medium; and (c) means for controlling a running speed of said record medium driven by said reproducing and/or recording apparatus on the basis of said data generated by said generating means.

According to a further aspect of the present invention, there is provided a method for editing a video signal by recording the same reproduced from a record medium driven by a reproducing apparatus on a record medium driven by a recording apparatus, said method comprising the steps of:

(1) inputting data of addresses corresponding to at least two positions of said record medium driven by said recording o reproducing apparatus, and data of a desired running speed of said record medium at least at said two positions of said record medium;

(2) calculating a desired running speed of said record medium at a desired position between two positions on the basis of said data of addresses and running speed;

(3) generating a control signal on the basis of the above calculating step; and (4) controlling said running speed of said record medium driven by said recording and/or reproducing apparatus on the basis of said control signal.

The above, and other objects, features and advantages of the present invention will be apparent in the following detailed description of a preferred embodiment of the invention when read in conjunction with the accompanying drawings, in which the same reference numerals identify corresponding parts in the several views.

DETAILED DESCRIPTION OF A PREFERRED EMBODIMENT

An embodiment of an editing apparatus according to the present invention will hereinafter be described with reference to FIGS. 2 to 8. In this embodiment, the present invention is suitably applied to an editing apparatus which edits a video signal or tape by a plurality of video tape recorders.

Figure 1:
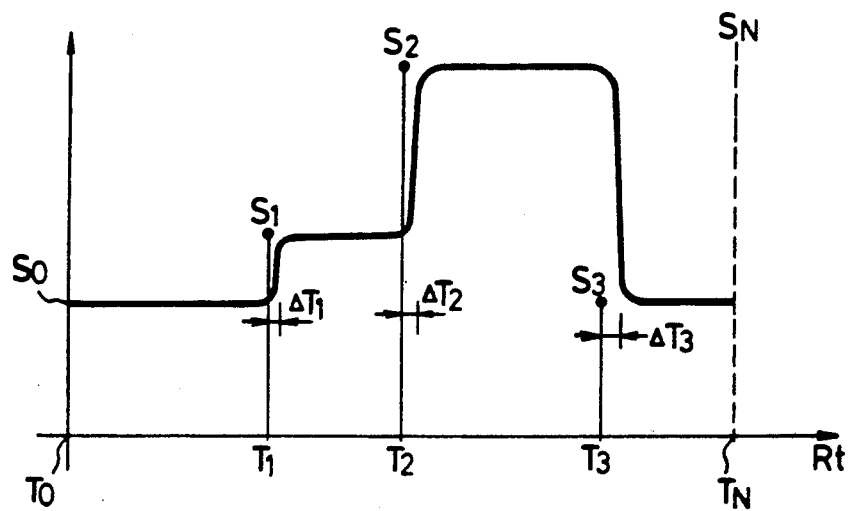
FIG. 1 is a schematic diagram showing a state in which a running speed of a tape reproduced by a reproducing video tape recorder is varied over a wide range.
Figure 2:
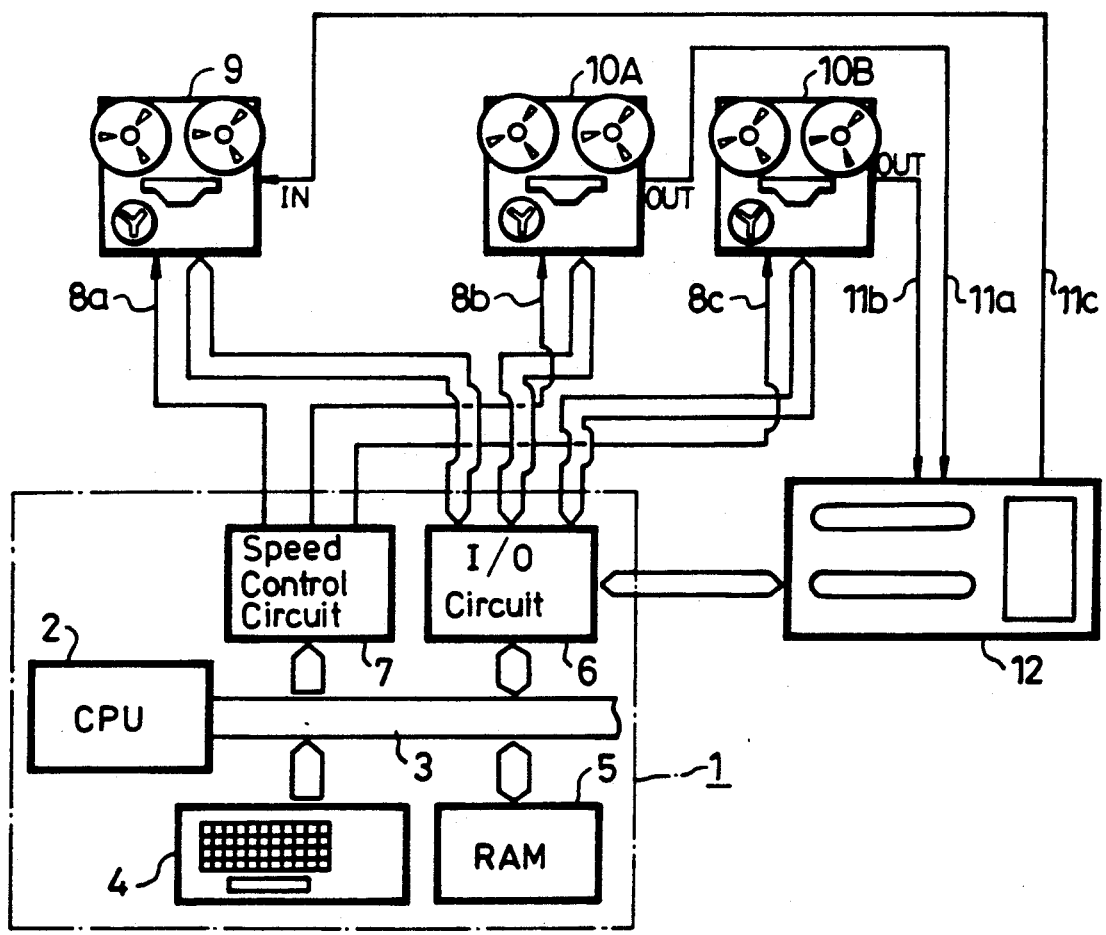
FIG. 2 is a schematic block diagram showing an embodiment of an editing apparatus according to the present invention.

Referring to the drawings in detail and initially to FIG. 2, there is provided an editing system which includes an editing apparatus 1 according to this invention. The editing apparatus 1 includes a central processing unit (CPU) 2 which controls the whole editing system and which carries out various calculations that will be described later. The central processing unit 2 controls other elements of the editing system through a system bus 3. An input keyboard 4 is shown to input a group of parameters {event time $T_i$, running speed Si of tape reproduced and speed mode $m_n$} or {event tape position xi, tape speed Si of tape reproduced and speed mode $m_n$} which will be described later. The paramaters thus determined are stored in a random access memory (RAM) 5. The central processing unit 2 successively calculates tape running speeds on the basis of the parameters stored in the random access memory 5 as will be described later. The tape speeds thus calculated are supplied through a speed control circuit 7 and signal lines 8a, 8b and 8c to a recording video tape recorder 9, a reproducing video tape recorder (or player) 10A or 10B. The recording video tape recorder 9, the players 10A, 10B and the editing apparatus 1 interchange various control signals and synchronizing signals via an input/output control circuit (I/O circuit) 6.

A video switching apparatus 12 is shown to selectively produce, on the basis of commands issued from the editing apparatus 1, an output signal 11a reproduced by the player 10A and/or an output signal 11b reproduced by the player 10B and a mixed reproduced output signal 11c of the output signals 11a and 11b to the recording video tape recorder 9.

When a reproduced picture such as a slow motion picture and a quick motion picture is edited by the editing apparatus 1 of this embodiment, a running speed of a tape recorded by the recording video tape recorder 9 or a running speed of a tape reproduced by either the player 10A or 10B and/or running speeds of the tape reproduced by both of the players 10A and 10B are varied from a normal tape running speed $V_0$ and video signals are supplied from the players 10A and 10B to the recording video tape recorder 9. In this embodiment, for simplicity, a running speed of a tape driven by the recording video tape recorder 9 (recording tape speed) V is fixed to the normal running speed $V_0$, and a running speed of a tape driven by the players 10A, 10B (reproducing tape speed) S is varied from the normal running speed $V_0$, whereby a so-called dynamic motion control (DMC) is effected.

When a rotary head type video tape recorder of helical scan system is used as the players 10A and 10B, then the running speed S of the tape driven by the players 10A and 10B can be varied in a range of from $-V_0$ (reverse mode) to $3V_0$ (playback mode with tape speed three times as high as the normal tape speed).

Figures 3A, 3B, 3C:
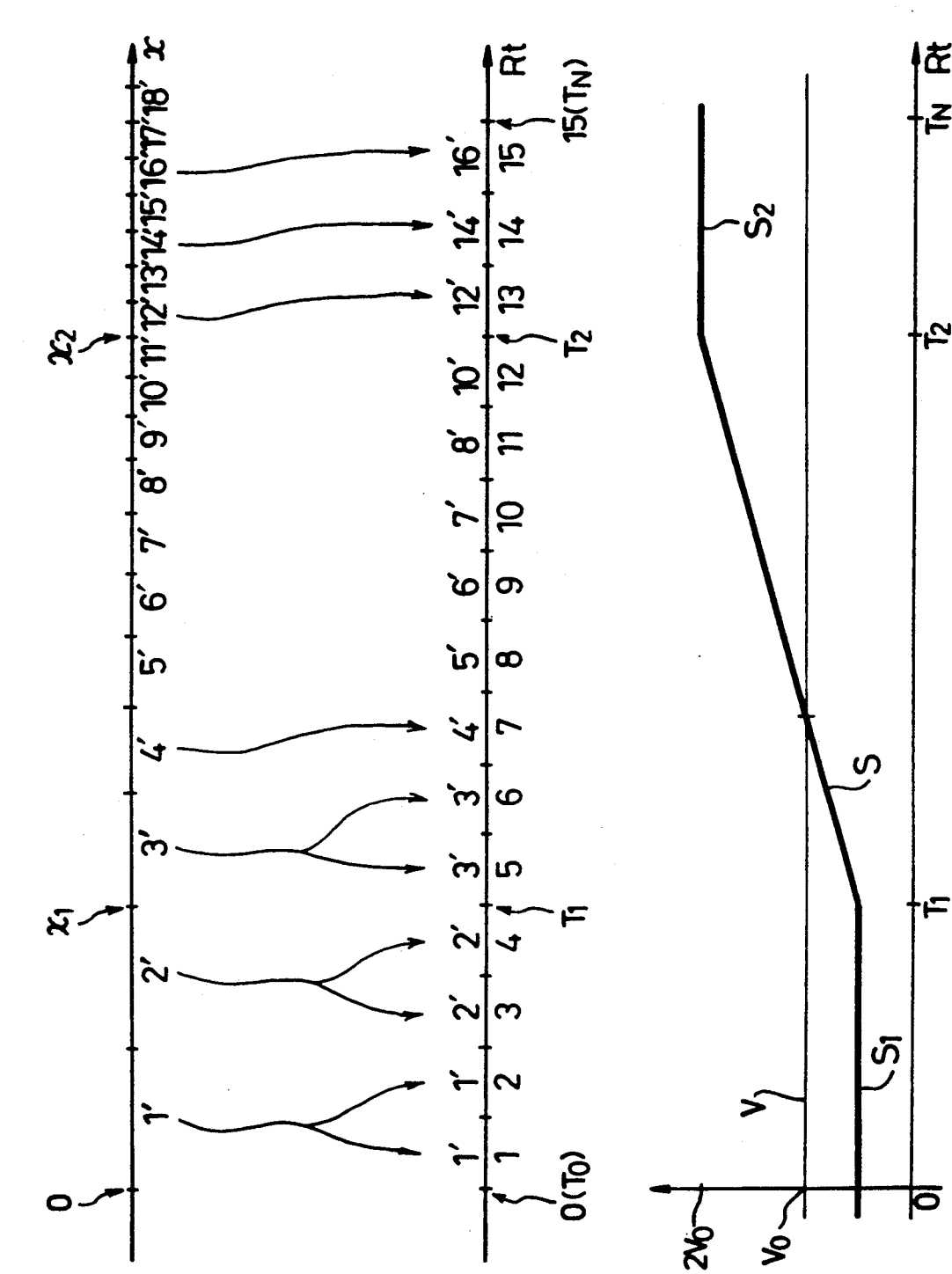
FIGS. 3A to 3C are, respectively, schematic representations used to explain the operation of the editing apparatus of the present invention shown in FIG. 2.

In order to understand the operation of the editing apparatus 1 of the present embodiment more clearly, let us now explain a relationship between [tape position (address) x] and [reference time Rt] with reference to FIGS. 3A to 3C.

The tape position address (or simply referred to as [tape position]) x assumes a position of a picture on a tape reproduced by the player 10A or 10B, namely, a position represented by frame numbers (1', 2', 3', ... ) as shown in FIG. 3A. The reference time Rt assumes a frame number (1, 2, 3, ... ) of a picture generated by the recording video tape recorder 9 as shown in FIG. 3B. In this embodiment, the recording video tape recorder 9 records a video signal at the constant tape speed $V_0$ as described above. Thus, assuming that $\Delta T$ (1/30 second) represents one frame period of time and that t represents a real time of a picture recorded by the video tape recorder 9, then the real time t may be expressed as $$t = \Delta T \cdot Rt \tag{1}$$

The equation (1) reveals that the reference time Rt can be used similarly to the real time t. The reference time Rt is therefore employed as time in this embodiment. Herein, it is to be noted, however, that the reference time Rt is dimensionless as is apparent from the equation (1).

When the running speed S of the tape driven by the player 10A or 10B is varied in a range of from $S_1$ to $S_2$ as shown in FIG. 3C, then the frames 1' and 2' of the picture reproduced by the player 10A or 10B are each repeatedly copied on the frames 1 to 4 of the picture recorded by the recording video tape recorder 9 as shown in FIG. 3B because a picture is reproduced as a slow motion picture in the ½ normal tape speed mode in the period of time of from 0 to $T_1$ (reference time Rt in the following description). Further, a picture is reproduced as a quick motion picture in the twice normal tape speed mode in the period of time of from $T_2$ to $T_N$ so that the frames 12', 13', . . . 17' of the picture reproduced by the player 10A or 10B are skipped by one frame each and are then copied onto the frames 13, 14 and 15 of the picture recorded by the recording video tape recorder 9 as shown in FIG. 3B, respectively.

Referring to FIG. 3C, it will be seen that the running speed S of the tape driven by the player 10A or 10B is increased in a uniform acceleration fashion from $S_1$ to $S_2$ during the time period of $T_1$ to $T_2$. As will be apparent from FIG. 3A, if the frame interval of the tape position address x is calculated on the basis of the real time t or the reference time Rt, then it becomes irregular.

Further, assuming that $x_1$ and $x_2$ represent tape position addresses, which are the frame numbers of the reproduced pictures at times $T_1$ and $T_2$ where the running speed S of the tape driven by the players 10A or 10B is varied, then the event at which the tape speed is varied may be determined on the basis of either the time ($T_0, T_1, \ldots, T_N$) of the reference time Rt or the tape position address x ($x_0, x_1, \ldots, x_N$).

In the editing apparatus 1 of the present embodiment, the event in which the running speed S of the tape driven by the player 10A or 10B is varied can be determined on the basis of either the above reference time Rt or the tape position address x.

When the reference time Rt is used to determine the event at which the running speed S of the tape driven by the player 10A or 10B is varied, the operator input input parameter groups $\{T_n, S_n$ and speed mode $m_n$ where $n=0, 1, \ldots, N\}$ shown on the following table 1 by utilizing the input keyboard 4 shown in FIG. 2.

TABLE 1

(Event time input mode)

| Input Parameters | |
|---|---|
| Event | $T_0, T_1, T_2, \ldots T_N$ |
| Reproducing tape speed | $S_0, S_1, S_2, \ldots S_N$ |
| Speed mode $m_n$ | 0, 1, 0, . . . |
| Calculation contents (linear mode) | |
| $Rt = T_n$ | Acceleration $a = \dfrac{S_{n+1} - S_n}{T_{n+1} - T_n}$ |
| $T_n < Rt < T_{n+1}$ | Reproducing tape speed $S = a(Rt - T_n) + S_n$ |

In table 1, the speed mode $m_n$ of low level [0] means [step mode] in which the tape running speed S is varied stepwise, whereas the speed mode $m_n$ of high level [1] means [linear mode] in which the tape running speed S is smoothly increased in a uniform acceleration fashion from $S_n$ to $S_{n+1}$ on the basis of the reference time Rt. The operation in the step mode is substantially the same as that in the prior art and therefore let us explain the essential point of the calculations done by the central processing unit 2 when the interval $T_n < Rt < T_{n+1}$ is the linear mode.

When the reference time Rt reaches the first time $T_n$, as shown on the table 1, the central processing unit 2 calculates an acceleration a on the basis of the equation given as $$a = (S_{n+1} - S_n)/(T_{n+1} - T_n) \qquad (2)$$

Each time the reference time Rt passes the first time $T_n$ and the recording video tape recorder 9 finishes the recording of one frame picture (or each time the reference time Rt is incremented by one), the central processing unit 2 increases or decreases the running speed S of the tape driven by the player 10A or 10B in a uniform acceleration fashion in compliance with the following equation $$S = a(Rt - T_n) + S_n \qquad (3)$$

The algorithm for controlling the running speed S of the tape driven by the player 10A or 10B in a dynamic motion control method on the basis of the reference time Rt while carrying out the calculations expressed in the equations (2) and (3) will be described with reference to a flow chart forming FIG. 4. In this case, time $T_0$ (usually "0") and $T_N$ assume edit-in point and edit-out point, respectively, and the edition unit is the reference time of from $T_0$ to $T_N$ which is proportional to the real time of the video tape edited.

Figure 4:
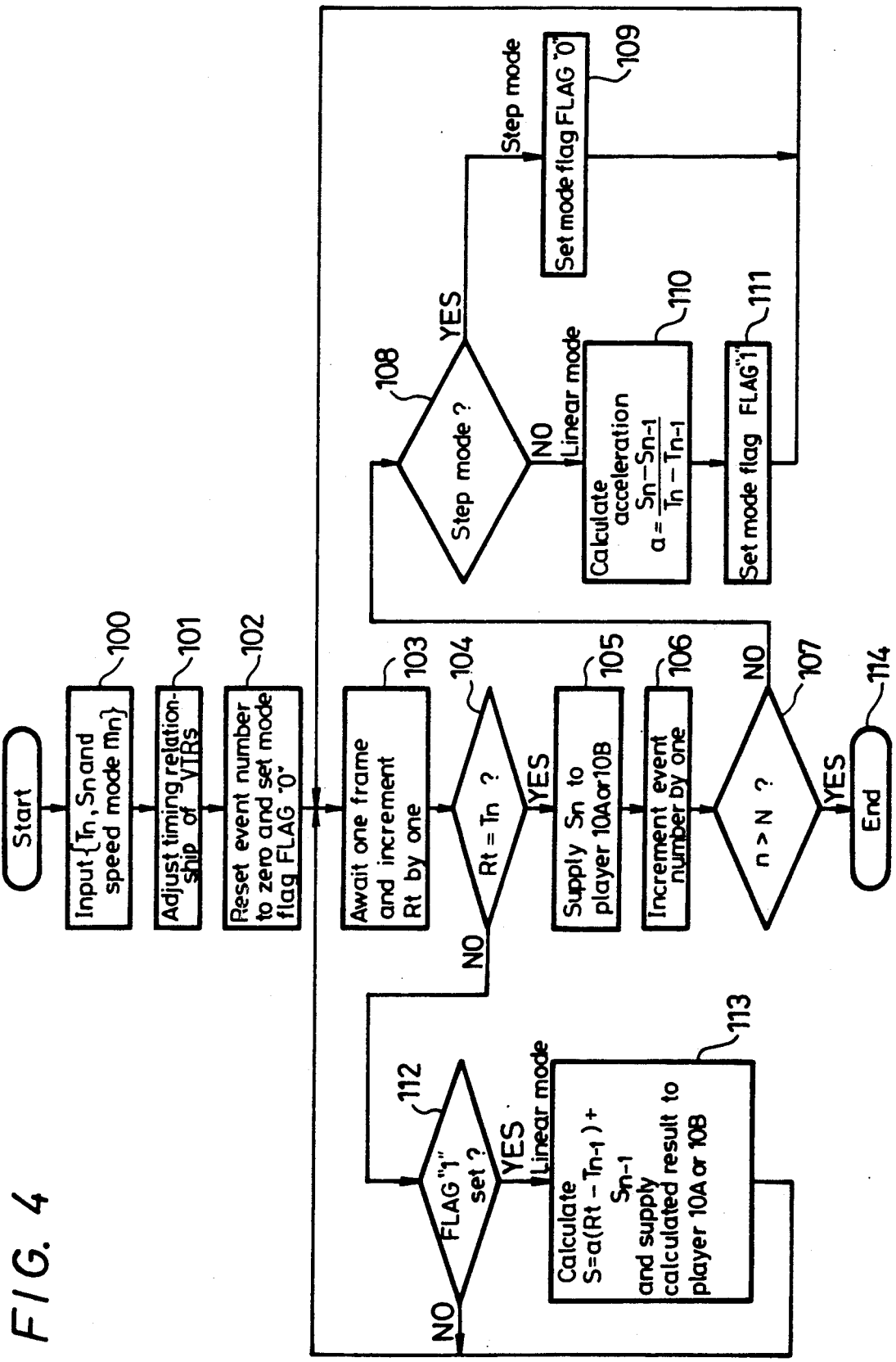
FIG. 4 is a flow chart to which reference will be made in explaining the operation of the invention in which a video signal is edited on a tape in a dynamic motion control fashion by controlling a running speed of a tape reproduced by a reproducing video tape recorder on the basis of a reference time.

Referring to the flow chart of FIG. 4, following the Start of the operation, the operator inputs the parameter groups $\{T_n, S_n$ and the speed mode $m_n\}$ by the input keyboard 4 (FIG. 2) in step 100. Then, the routine proceeds to step 101, whereat the central processing unit 2 in the editing apparatus 1 adjusts a timing relationship among the recording video tape recorder 9 and the players 10A and 10B. In the next step 102, the event number n, which is a variable used in the folllowing operation to indicate the order of the events, is reset to zero, and a mode flag FLAG "0" is set. The mode flag "0" indicates the step mode, whereas the mode flag "1" indicates the linear mode. The routine then proceeds to step 103, wherein the central processing unit 2 waits till the recording video tape recorder 9 ends the recording of one frame picture, and increments the reference time Rt by 1. In the next decision step 104, it is determined by the central processing unit 2 whether the time Rt reaches the first time $T_n$ (in this case, $T_0$, namely, "0"). In this description, the time Rt begins with the minus time because the timing relationship among the recording video tape recorder 9 and the players 10A and 10B have to be adjusted in step 101. If the time Rt reaches the first time $T_n$ as represented by a YES at decision step 104, the routine proceeds to step 105, in which the central processing unit 2 supplies the tape running speed $S_n$, inputted as a parameter, through the speed control circuit 7 to the player 10A or 10B. Then, the event number n is incremented by 1 in the next step 106. It is determined at the next decision step 107 by the central processing unit 2 whether the event number n reaches the total event number N, or whether the event number n reaches the terminating point $T_N$ of the edition unit. If not, the routine moves to the next decision step 108, in which it is determined by the central processing unit 2 whether speed mode $m_{n-1}$ (this means that n is incremented by 1) indicates the step mode.

If it indicates the step mode as represented by a YES at decision step 108, the routine proceeds to step 109, in which the central processing unit 2 sets the mode flag FLAG "0", and the routine returns to step 103. If on the other hand it is determined that the speed mode $m_{n-1}$ indicates the linear mode as represented by a NO at step 108, the routine moves to step 110. In step 110, the central processing unit 2 calculates the acceleration a in compliance with the equation (2). Then, the routine proceeds to step 111, in which the central processing unit 2 sets the mode flag FLAG "1", and the routine again returns to step 103.

If it is determined at step 104 that the time Rt lies in a range of from $T_{n-1} < Rt < T_n$, the routine proceeds to the next decision step 112. It is determined at decision step 112 by the central processing unit 2 whether the mode flag FLAG "1" is set. If the mode flag FLAG "1" is not set and the mode flag FLAG "0" is set as represented by a NO at decision step 112, then this means that the step mode and the running speed S might be $S_{n-1}$ so that the routine returns to step 103. If it is determined that the mode flag FLAG "1" is set (linear mode), the routine proceeds to step 113. In step 113, the central processing unit 2 calculates the running speed S of the tape driven by the player 10A or 10B in compliance with the above-mentioned equation (3). Then, the calculated result S is supplied to the player 10A or 10B, and the routine returns to step 103.

As described above, the editing apparatus 1 varies the running speed of the tape driven by the player 10A or 10B in a stepwise fashion or in a uniform acceleration fashion on the basis of the thus determined parameter groups $\{T_n, S_n$ and the speed mode $m_n\}$, thereby editing the video signal on the tape.

If it is determined that the event number n reaches the terminating point of the edition unit ($Rt = T_N$) as represented by a YES at step 107, the routine proceeds to step 114, in which the editing operation is ended, and the editing apparatus 1 is set in the standby mode for awaiting the next edition.

When the running speed S of the tape driven by the player 10A or 10B is varied on the basis of the tape position address x, input parameter groups {tape positions $x_n$, the speed $S_n$ and speed mode mn} (n=0, 1, . . ., N) shown on the following table 2 are inputted by the input keyboard 4 shown in FIG. 4.

TABLE 2

(Event position input mode)

| Input Parameters | |
|---|---|
| Event tape speed | $x_0, x_1, x_2, \ldots x_N$ |
| Reproducing tape running speed | $S_0, S_1, S_2, \ldots S_N$ |
| Speed mode $m_n$ | 0, 1, 0, . . . |
| Calculation contents (linear mode) | |
| $x = x_n$ | Acceleration $a = \dfrac{S_{n+1}^2 - S_n^2}{2(x_{n+1} - x_n)}$ |
| | Event time $T_{n+1} = T_n + \dfrac{S_{n+1} - S_n}{a}$ |
| $x_n < x < x_{n+1}$ | Reproducing tape running speed $S = \pm \sqrt{S_n^2 + 2a(x - x_n)}$ |

The speed mode $m_n$ on the table 2 is similar to the speed mode $m_n$ shown on the table 1. That is, when the speed mode $m_n$ is at high level [1], this means [linear mode] in which the tape running speed S is smoothly varied from $S_n$ to $S_{n+1}$ in a uniform acceleration fashion. The most specific feature of this embodiment lies in that although the running speed $S_n$ of the tape driven by the player 10A or 10B is defined on the basis of the tape position $x_n$, in the linear mode, the running speed S is varied from $S_n$ to $S_{n+1}$ in a uniform acceleration fashion on the basis of the reference time Rt. Consequently, if the interval of $x_n < x < x_{n+1}$ is in the linear mode, then the central processing unit 2 carries out a calculation that is more complex than the above equations (2) and (3) as will be explained below.

In a case of uniform acceleration movement, the running speed S is expressed as $$S = \frac{ds}{dt} = at + b \quad (4)$$

where a is the acceleration, t is the time and b is a constant. Then, integrating the equation (4), the tape position x and the running speed S are expressed by the following equation (5)

$$x = (a/2)t^2 + bt + c = S^2/(2a) + d \quad (5)$$

where c and d are constants. Further, the equation (5) is satisfied by substituting $(x_n, S_n)$ and $(x_{n+1}, S_{n+1})$, and this gives $$x_n = S_n^2/(2a) + d \quad (6a)$$

$$x_{n+1} = S_{n+1}^2/(2a) + d \quad (6b)$$

From the equations (6a) and (6b), the acceleration a can be expressed as $$a = \frac{S_{n+1}^2 - S_n^2}{2(x_{n+1} - x_n)} \quad (7)$$

When the acceleration a is already known from the equation (7), the running speed S at the tape position x of $x_n < x < x_{n+1} < x < x_{n+1}$ can be calculated by the following equation (8) which results from replacing $S_{n+1}$ with S in the equation (7) as , $$S = \pm \sqrt{S_n^2 + 2a(x - x_n)} \quad (8)$$

A minus sign in the equation (8) means that the player 10A or 10B is operated in the reverse mode.

Figure 5:
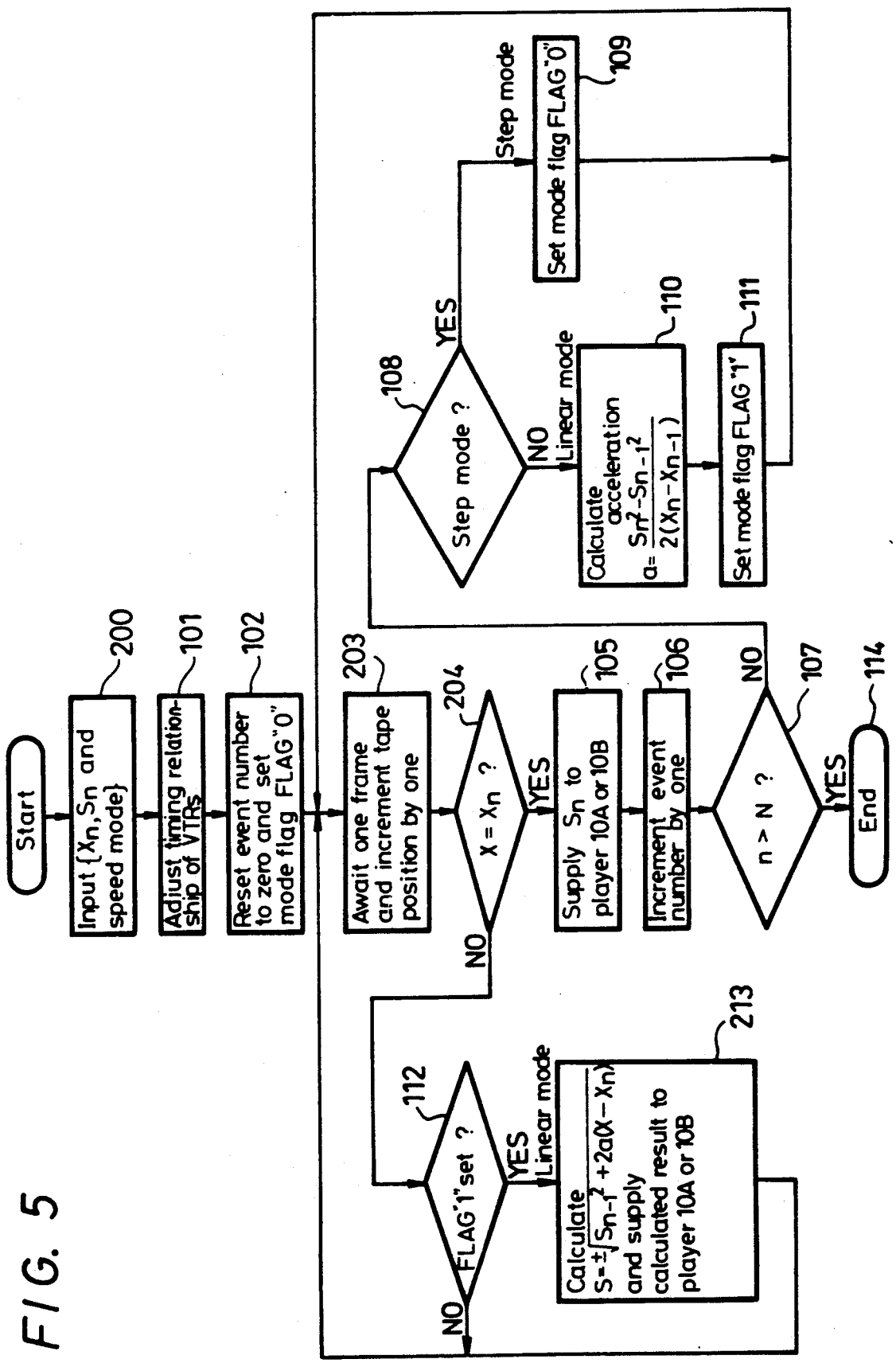
FIG. 5 is a flow chart to which reference will be made in explaining the operation of the invention in which a video signal is edited on a tape in a dynamic motion control fashion by controlling a running speed of a tape reproduced by a reproducing video tape recorder on the basis of a tape position.

With reference to a flow chart forming FIG. 5, let us now explain the algorithm of the dynamic motion control system in which while performing the calculations expressed by the above-mentioned equations (7) and (8) the running speed S of the tape driven by the player 10A or 10B is controlled on the basis of the tape position x of the tape reproduced.

In the following explanation, tape positions $x_0$ and $x_N$ respectively represent the edit-in point and edit-out point, and a picture reproduced by the player 10A or 10B is edited in the interval of $x_0$ to $x_N$. In the flow chart of FIG. 5, the same steps as those in FIG. 4 are marked with the same reference numerals and therefore need not be described in detail.

Referring to FIG. 5, following the Start of the operation, the operator inputs, at step 200, parameter groups {tape position $x_n$, speed $S_n$ and speed mode $m_n$ where n=0, 1, : . . , N} by the input keyboard apparatus 4 shown in FIG. 2. Then, the routine proceeds through steps 101 and 102 to step 203. In step 203, the central processing unit 2 waits till the player 10A or 10B finishes the playback of one frame picture, and then increments the tape position x by 1. Then, the routine proceeds to the next decision step 204, wherein it is determined by the central processing unit 2 whether the tape position x reaches the event $x_n$. If the tape position x reaches the event $x_n$ as represented by a YES at step 204, then the routine proceeds to step 105 and advances to step 108. If this interval is in the linear mode, the routine proceeds to step 210, whereat the central processing unit 2 calculates the acceleration a on the basis of the reference time Rt in compliance with the equation (7). If it is determined that the tape position x lies in a range of from $x_{n-1} < x < x_n$ (n is incremented by 1) as respresented by a NO at decision step 204, the routine proceeds to the next decision step 112, in which the central processing unit 2 determines whether the mode flag FLAG "1" is set. If it is determined that the mode flag FLAG "1" is set (linear mode) as represented by a YES at step 112, the routine proceeds to step 213, whereat the central processing unit 2 calculates the running speed S at the tape position x in compliance with the equation (8), and supplies the calculated result through the speed control circuit 7 to the player 10A or 10B. In this way, the editing apparatus 1 varies in a stepwise fashion or in a uniform acceleration fashion the running speed S of the tape driven by the player 10A or 10B on the basis of the parameter groups {tape position $x_n$, speed $S_n$ and speed mode $m_n$} thus determined, thereby editing a video signal on the tape.

Figure 6:
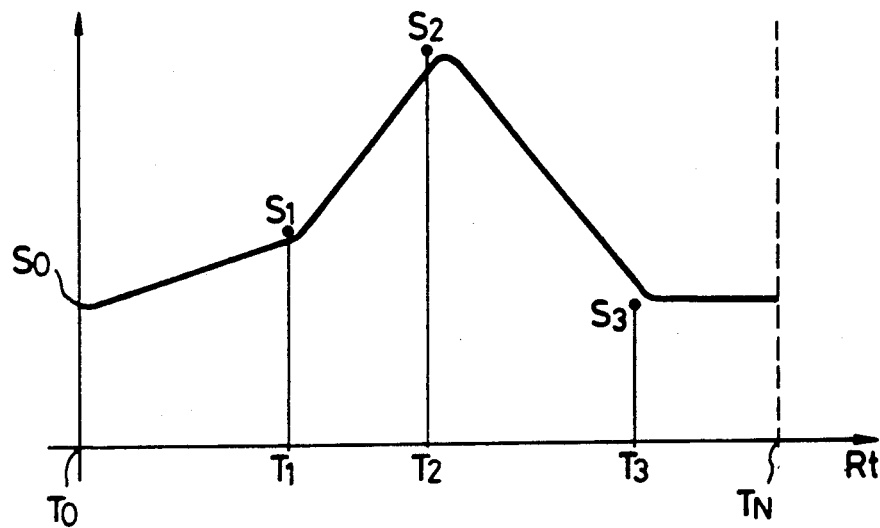
FIGS. 6 to 8 are respectively schematic diagrams showing examples in which a running speed of a tape reproduced by a reproducing video tape recorder is varied in a wide variety of ranges.

FIG. 6 illustrates an example in which the running speed S of the tape driven by the player 10A or 10B is varied by the editing apparatus 1 of this embodiment when the whole interval is set in the linear mode by defining the tape running speed $S_n$ at the respective events $T_0, T_1, \ldots, T_N$ on the reference time Rt.

As will be apparent from FIG. 6, according to the editing apparatus 1 of the present embodiment, determining a small number of parameter groups $\{T_n, S_n$ and $m_n\}$, it is possible to obtain a reproduced picture whose motion speed can be smoothly changed as shown in FIG. 6.

Figure 7:
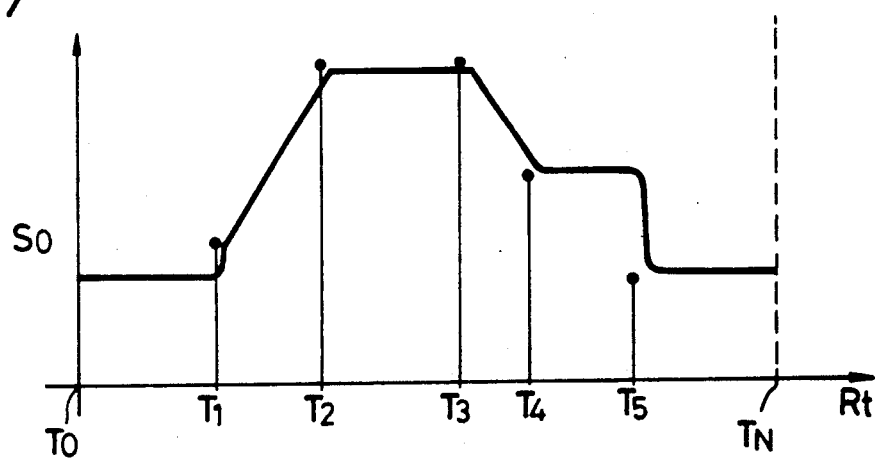

FIG. 7 illustrates an example in which the running speed S of the tape driven by the player 10A or 10B is varied by the editing apparatus 1 of this embodiment when the respective intervals are set in the combination of the step mode and the linear mode by defining the tape running speeds on the respective events on the reference time Rt. Since the step mode and the linear mode are combined as described above, it is possible to obtain a reproduced picture whose motion speed can be varied in a complex manner as shown in FIG. 7.

Figure 8:
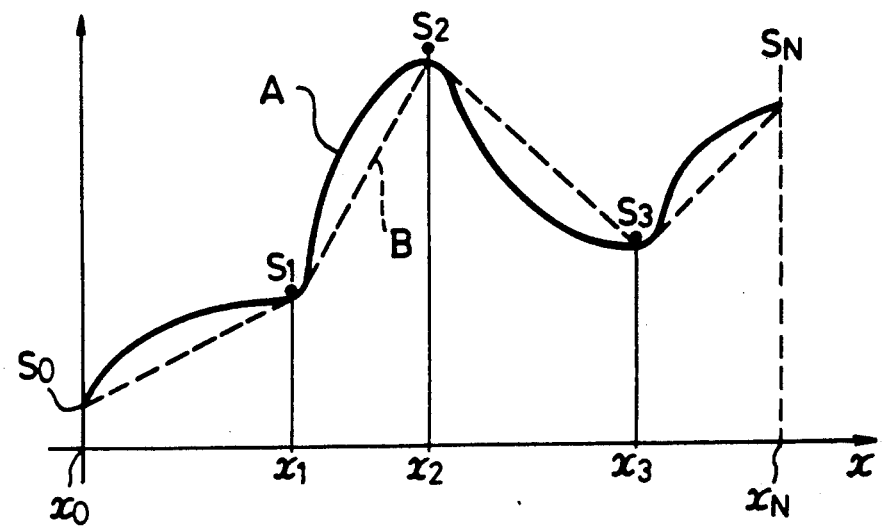

FIG. 8 illustrates an example in which the running speed S of the tape driven by the player 10A or 10B is varied by the editing apparatus 1 of this embodiment when the whole interval is set in the linear mode by defining the running speed $S_n$ on the respective events $x_0, x_1, \ldots, x_n$ on the tape position x of the tape reproduced. The running speed S of the tape driven by the reproducing video tape recorder 10A or 10B is varied in a uniform acceleration fashion on the basis of the reference time Rt so that it is varied in a secondary curve fashion relative to the tape position x as shown by a solid line A in FIG. 8. When the respective events on the tape position x are defined as described above, the motion speed of the picture reproduced by the player 10A or 10B is varied in a range between one specific scene and another in a uniform acceleration fashion, thus making it possible to more effectively edit the video signal on the tape, which affords a more useful editing apparatus in practice.

According to the editing apparatus of this embodiment, the running speed of the tape is successively varied in a uniform acceleration fashion on the basis of the reference time Rt as described above. The present invention is not limited to the above method and the following variants may be possible. As shown by a broken line B in FIG. 8, the running speed S of the tape may be linearly varied on the basis of the tape position x. Alternatively, the running speed S may be varied in compliance with a curve expressed by a high-order function.

While the editing apparatus of this embodiment carries out the dynamic motion control by varying the running speed S of the player, it is obvious that the same action and effect can be achieved by varying the running speed of the tape driven by the recording video tape recorder.

Further, the editing apparatus of the present invention is not limited to the video tape recorder and it can be applied to a wide variety of systems utilizing nonvolatile media such as a video disk, an audio disk, a compact disc and the like.

Since the editing apparatus of the present invention is constructed as described above, varying the running speed of the tape in the designated interval in a uniform acceleration fashion, it is possible to edit a reproduced picture whose motion speed is varied in a complex manner or whose motion speed is varied smoothly on the basis of a small number of parameters determined.

Further, according to the present invention, the picture whose motion speed is smoothly varied is repeatedly played back so that when an effective slow or quick motion picture is obtained, the same can be shifted to another portion or it can be copied to another video program to be edited.

Furthermore, according to the other embodiment of the editing apparatus of the present invention, since the running speed of the tape is controlled on the basis of the tape position, the tape running speed can be controlled by defining a small number of parameters. Also, the video signal is edited on the video tape so that the motion speed of the reproduced picture can be smoothly varied between the scenes on the original picture played back.

Having described a preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for editing a video signal reproduced from a record medium driven by a reproducing apparatus and recorded on a record medium driven by a recording apparatus, said editing apparatus comprising:
   input means for inputting data relating to desired first and second running speeds of said record medium driven by said reproducing and/or recording apparatus at first and second times, respectively;
   calculating means employing an algorithm for calculating a running speed of said record medium at a desired time near said first and second times on the basis of said first and second running speeds; and
   means for generating a running speed of said record medium at said desired time on the basis of the running speed calculated by said calculating means.

2. Editing apparatus according to claim 1, in which said input means includes a keyboard and a random access memory for storing said data.

3. Editing apparatus according to claim 2, in which said calculating means includes a microcomputer.

4. Apparatus for editing a video signal reproduced from a record medium driven by a reproducing apparatus and recorded on a record medium driven by a recording apparatus, said editing apparatus comprising:
   input means for inputting data relating to desired first and second running speeds of said record medium driven by said reproducing and/or recording apparatus at first and second physical positions of said record medium, respectively;
   calculating means employing an algorithm and connected to said input means for generating data relating to the running speed of said record medium at a desired position near said first and second physical positions by calculating data corresponding to said first and second running speeds of said record medium; and
   means for controlling the running speed of said record medium driven by said reproducing and/or recording apparatus on the basis of said data generated by said generating means.

5. Editing apparatus according to claim 4, in which said input means includes a keyboard and a random access memory for storing said data.

6. Editing apparatus according to claim 5, in which said calculating means includes a microcomputer.

7. Editing apparatus according to claim 4, in which said input means inputs further data to control a speed mode of said reproducing or recording apparatus so that a step mode or a linear mode which defines a speed mode of said record medium can be chosen.

8. Editing apparatus according to claim 7, in which said control means controls the running speed of said record medium in compliance with an equation $S = a(Rt - T_n) + S_n$, wherein "Rt" is a reference time, "$T_n$" is a first time, "$S_n$" is the running speed at the first time $T_n$ and "a" is an acceleration defined as $$\frac{S_{n+1} - S_n}{T_{n+1} - T_n}.$$

when said linear mode is chosen.

9. Editing apparatus according to claim 6, in which said input means inputs further data to control a speed mode of said reproducing or recording apparatus so that the step mode of said record medium can be chosen.

10. Editing apparatus according to claim 9, in which said control means controls the running speed of said record medium in compliance with an equation $S = \pm\sqrt{S_n^2 + 2a(x - x_n)}$, wherein "x" is a desired position of said record medium "$x_n$" is a first physical position of said record medium, "$S_n$" is the running speed of said record medium at the first physical position of said record medium and "a" is a uniform acceleration defined as $$\frac{S_{n+1}^2 - S_n^2}{2(x_{n+1} - x_n)}.$$

11. A method of editing a video signal reproduced from a record medium driven by a reproducing apparatus and recorded on a record medium driven by a recording apparatus, said method comprising the steps of:
   inputting data relating to addresses corresponding to at least two positions of said record medium driven by said recording or reproducing apparatus, and data relating to a desired running speed of said record medium at least at said two positions of said record medium;
   employing an algorithm to calculate a desired running speed of said record medium at a desired position near said two positions on the basis of said data relating to addresses and running speed;
   generating a control signal on the basis of the above calculating step; and
   controlling said running speed of said record medium driven by said recording and/or reproducing apparatus on the basis of said control signal.

* * * * *

UNITED STATES PATENT AND TRADEMARK OFFICE
CERTIFICATE OF CORRECTION

PATENT NO. : 5,103,348
DATED : April 7, 1992
INVENTOR(S) : Sasho et al.

It is certified that error appears in the above-identified patent and that said Letters Patent is hereby corrected as shown below:

Col. 2, line 58, change "$\sigma$" to --or--
Col. 7, line 45, change "$S_{n+1}^2$" to --$S_{n+1}^2$--
Col. 8, line 27, change "$S_{n+1}^2$" to --$S_{n+1}^2$--
          line 34, after "as" delete ","

Col. 12, line 15, after "medium" insert --,--
          line 21, change "$S_{n+1}^2$" to --$S_{n+1}^2$--

Signed and Sealed this

Twenty-sixth Day of April, 1994

Attest:

BRUCE LEHMAN

Attesting Officer   Commissioner of Patents and Trademarks